Dec. 20, 1927.
E. C. WALKER
1,653,445
PRESSURE REGULATOR
Filed Nov. 8, 1920
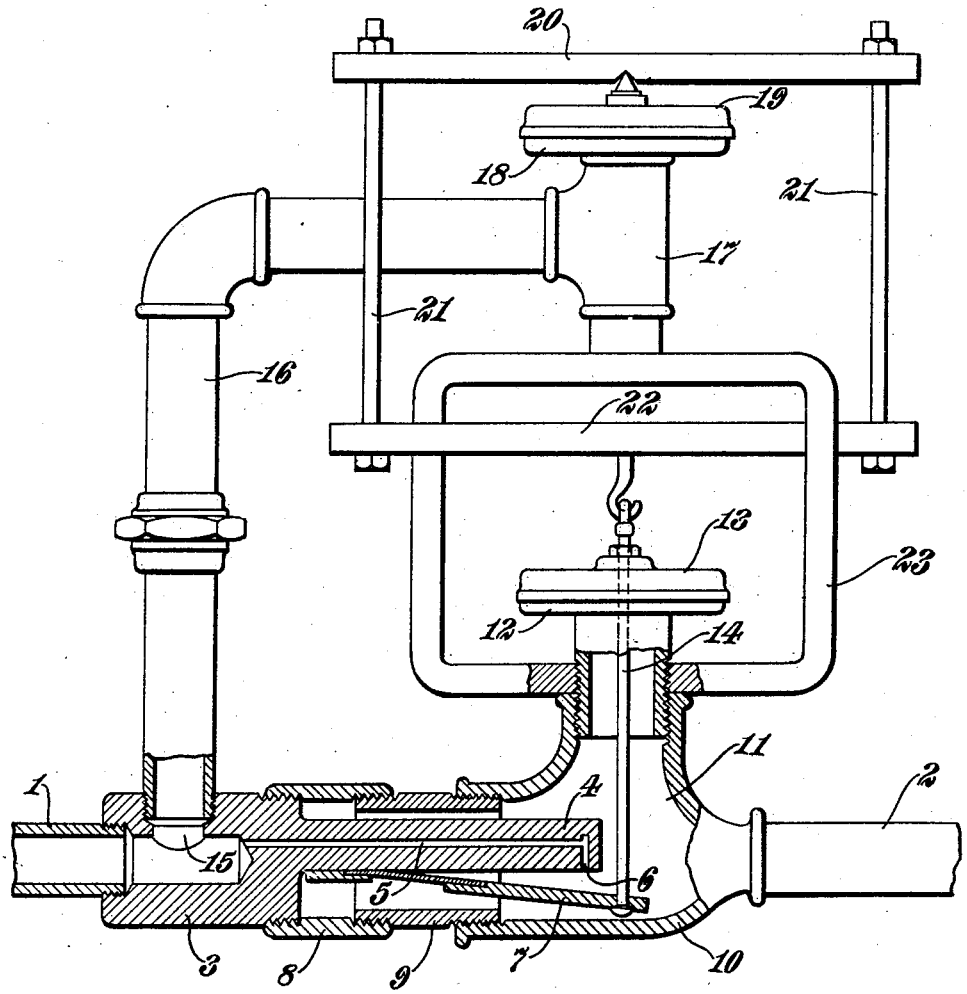
INVENTOR:
EDWARD C. WALKER,
BY
John H. Bruninga,
HIS ATTORNEY.

Patented Dec. 20, 1927.

1,653,445

UNITED STATES PATENT OFFICE.

EDWARD C. WALKER, OF KINLOCK, MISSOURI, ASSIGNOR TO NATIONAL LEAD COMPANY, OF NEW YORK, N. Y., A CORPORATION OF NEW JERSEY.

PRESSURE REGULATOR.

Application filed November 8, 1920. Serial No. 422,681.

This invention relates to pressure regulators and more particularly to that type of regulators designed to reduce the fluid pressure supplied to a lower value for delivery to the apparatus wherein it is to be utilized.

One of the serious difficulties encountered in apparatus of this kind is that of making the device sufficiently sensitive to variations of supply pressure. The device is usually arranged to be actuated by variations in the delivery pressure, and to maintain that pressure constant by maintaining the valve opening constant so as to maintain the rate of flow constant. This theory, however, assumes a constant supply pressure, so that with a constant valve opening there will be a constant flow. Suppose, for instance, that with a supply pressure $P^1$, and a valve opening $A^1$, a delivery pressure $p^1$ is obtained. Now, $p^1$ will be constant so long as $P^1$ and $A^1$ are constant. Suppose, now that $P^1$ increases to $P^2$, then with $A^1$ unchanged, $p^1$ will increase. This new pressure, acting on the regulating diaphragm will change the valve opening to $A^2$, smaller than $A^1$. If the supply pressure remains constant at $P^2$, a new balance will be obtained with a new delivery pressure $p^2$, corresponding to the new valve opening $A^2$. It will be evident, therefore, that the delivery pressure cannot be maintained constant with a variable supply pressure and a regulating diaphragm responsive only to changes in the delivery pressure.

One of the objects of this invention, therefore, is to provide means for regulating the fluid pressure of the delivery which shall respond not only to changes of pressure at the delivery end, but also to changes of pressure of the supply.

Another object of this invention is to provide means for regulating the fluid pressure of the delivery which shall respond to changes in pressure of either the supply or the delivery and which shall be adapted to properly coordinate the effect of said changes so as to maintain the delivery pressure uniform.

Further objects will appear from the detail description taken in connection with the accompanying drawing which shows a view partly in elevation and partly in section of one embodiment of this invention.

Referring now to the drawing, 1 designates the supply pipe and 2 the delivery pipe of a device for regulating the pressure of a liquid, gas or other fluid. The pipe 1 leads to the fitting 3 provided with a tubular member 4 having a duct 5 communicating with the supply and terminating in a nozzle 6. Flexibly mounted on the fitting 3 is a valve or baffle 7 adapted to lie in the fluid stream issuing from the orifice 6.

Mounted on the fitting 3, as by means of the connections 8 and 9, is another fitting 10 communicating with the delivery pipe 2 and adapted to form a chamber 11 enclosing the tubular member 4 and the valve 7. This chamber 11 has an outlet providing unrestricted communication with the space enclosed by a pair of flexible diaphragms 12 and 13, the lower diaphragm 12 being supported on the fitting 10, and the upper diaphragm 13 being connected by means of a rod 14 to the valve 7. It will be seen that with this arrangement any increase of pressure in the chamber 11 will act upon the diaphragm 13 so as to flex that diaphragm upwardly thereby acting through the rod 14 to move the valve 7 to close the orifice 6. This will have the effect of modifying the flow of fluid from said orifice so as to again reduce the pressure in the chamber 11.

The fitting 3 has a second outlet 15 communicating with a pipe 16, leading to a second chamber 17 of which the space between a second pair of flexible diaphragms 18 and 19 forms a part and which thus has unrestricted communication with the supply. This chamber contains fluid under the actual pressure of the supply. The upper diaphragm 19 has mounted thereon a cross bar 20 connected by means of links 21 to a second cross bar 22, which is in turn connected to the upper diaphragm 13 of the lower pair. A bracket 23 mounted on the fitting 10 and supporting at its upper portion the chamber 17, forms a rigid connection between the chamber 11 and the chamber 17 and operates to maintain a constant distance between the diaphragms 13 and 19 so that any movement of either diaphragm will at once be communicated to the rod 14 and the valve 7.

The operation is as follows. The fluid entering by the pipe 1 passes through the duct 5 and issues in a jet from the nozzle 6 impinging against the valve 7. The adjustment of the valve 7 relatively to the orifice 6 reacts on the flowing jet and determines the degree of reduction in pressure between the supply and the chamber 11. The fluid pressure in the chamber 11 acting upon the diaphragms 12 and 13 and through them on the rod 14, will tend to lift said rod when the pressure increases and lower it when the pressure decreases so as to move the valve 7 toward or from the orifice 6, thereby modifying the flow of fluid from said orifice so as to maintain the pressure in the chamber 11 constant.

The pressure of the supply acts through the pipe 16 and the chamber 17 upon the diaphragms 18 and 19 and therethrough upon the connections 20, 21 and 22 and tends to raise said connections when the supply pressure increases, and to lower them when it decreases, thereby actuating the rod 14 in a corresponding manner so as to raise or lower the valve 7 to regulate the pressure in the chamber 11 as previously described.

It will be seen that by this arrangement, the valve 7 is actuated by means responsive to either the pressure of the supply or that of the delivery so as to maintain the delivery pressure in the chamber 11 uniform. It will be seen that a change of the supply pressure will at once actuate the regulating means, before such change can be communicated through the restricted duct 5 to the nozzle on the delivery side, to maintain delivery pressure uniform and that the regulating means actuated by the supply pressure and the means actuated by the delivery pressure are interconnected so as to properly coordinate their action to maintain the delivery pressure uniform.

It is obvious that various changes may be made in the details of construction without departing from the spirit of this invention; it is, therefore, to be understood that this invention is not to be limited to the specific details shown and described.

Having thus described this invention, what is claimed is:

1. A fluid controlling device having a supply connection and a delivery connection, comprising, a jet-forming nozzle connected with the supply, a baffle adapted to cause reaction of the flow of fluid from said nozzle, and means for changing the relative positions of said nozzle and said baffle having unrestricted connection with both the supply and the delivery pressure and operating upon either a change of fluid pressure of the supply or a change of fluid pressure of the delivery, adapted to maintain said delivery pressure uniform at a different value from said supply pressure.

2. A fluid controlling device having a supply connection and a delivery connection, comprising, a jet-forming nozzle connected with the supply, a baffle on the delivery side of said nozzle adapted to cause reaction of the flow of fluid therefrom, and means for changing the relative positions of said nozzle and said baffle having unrestricted connection with both the supply and the delivery pressure and responsive both to changes of fluid pressure of the supply and to changes of fluid pressure of the delivery, adapted to maintain said delivery pressure uniform and at a different value from said supply pressure.

3. A fluid controlling device having a supply connection and a delivery connection, comprising, a nozzle having a restricted approach and connecting the supply with the delivery, regulating means having unrestricted connection with and actuated primarily by the supply pressure taken from a point in advance of said approach, regulating means having unrestricted connection with and actuated by the delivery pressure, and means adapted to insure cooperation of said regulating means to regulate said delivery pressure.

4. A fluid controlling device having a supply connection and a delivery connection, comprising, a jet-forming nozzle connected with the supply, a baffle on the delivery side of said nozzle adapted to cause reaction of the flow therefrom, a diaphragm having unrestricted connection with and acted upon primarily by the fluid pressure of the supply, means actuated by said diaphragm to maintain the fluid pressure of the delivery uniform, a second diaphragm having unrestricted connection with and acted upon by the fluid pressure of the delivery, means actuated by said second diaphragm adapted to maintain the fluid pressure of the delivery uniform, and means adapted to insure cooperation of said actuated means.

5. A fluid controlling device having a supply connection and a delivery connection, comprising, a jet-forming nozzle connected with the supply through a restricted approach, a baffle on the delivery side of said nozzle adapted to cause reaction of the flow therefrom, a diaphragm having unrestricted connection with and acted upon primarily by the fluid pressure of the supply, a diaphragm having unrestricted connection with and acted upon by the fluid pressure of the delivery, and means connecting said diaphragms adapted to maintain the fluid pressure of the delivery uniform.

6. A fluid controlling device having a supply connection and a delivery connection, comprising, a nozzle connected with the supply by a long restricted approach and adapted to increase the velocity of flow of the fluid, a baffle adapted to cause reaction of the flow of fluid from the said nozzle, and means having unrestricted connection with both the supply and the delivery pressure and responsive to changes in the fluid pressure of either the supply or the delivery for changing the relative positions of said nozzle and said baffle adapted to regulate the delivery pressure.

7. A fluid controlling device having a supply connection and a delivery connection, comprising, a nozzle connected with the supply by a long restricted approach and adapted to increase the velocity of flow of the fluid, a baffle spaced from and adapted to influence the flow of fluid from said nozzle, regulating means for said baffle having unrestricted connection with and actuated by the supply pressure taken from a point in advance of said approach, regulating means for said baffle having unrestricted connection with and actuated by the delivery pressure, and means adapted to insure cooperation between said regulating means to regulate the delivery pressure.

In testimony whereof I affix my signature this 13 day of Sept., 1920.

EDWARD C. WALKER.